US009910309B2

(12) United States Patent
Li et al.

(10) Patent No.: US 9,910,309 B2
(45) Date of Patent: Mar. 6, 2018

(54) ARRAY SUBSTRATE HAVING A TOUCH FUNCTION AND DISPLAY DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Man Li, Guangdong (CN); Yao-Li Huang, Guangdong (CN); Jianxing Xie, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 281 days.

(21) Appl. No.: 14/785,829

(22) PCT Filed: Aug. 14, 2015

(86) PCT No.: PCT/CN2015/087003
§ 371 (c)(1),
(2) Date: Oct. 20, 2015

(87) PCT Pub. No.: WO2017/024599
PCT Pub. Date: Feb. 16, 2017

(65) Prior Publication Data

US 2017/0322440 A1 Nov. 9, 2017

(30) Foreign Application Priority Data

Aug. 10, 2015 (CN) .......................... 2015 1 0486015

(51) Int. Cl.
*G06F 3/041* (2006.01)
*G06F 3/044* (2006.01)
*G02F 1/1333* (2006.01)

(52) U.S. Cl.
CPC .......... *G02F 1/13338* (2013.01); *G06F 3/044* (2013.01); *G06F 3/0412* (2013.01); *G09G 2300/0426* (2013.01)

(58) Field of Classification Search
CPC .... G02F 1/13338; G06F 3/0412; G06F 3/044; G09G 2300/0426
See application file for complete search history.

(56) References Cited

U.S. PATENT DOCUMENTS

2014/0061652 A1* 3/2014 Park .................. G02F 1/136286 257/59
2015/0170610 A1* 6/2015 Kurasawa ................ G09G 5/18 345/174
2016/0291741 A1* 10/2016 Zhou ....................... G06F 3/044

* cited by examiner

*Primary Examiner* — Charles Hicks
(74) *Attorney, Agent, or Firm* — Andrew C. Cheng

(57) ABSTRACT

The disclosure is related to an array substrate having a touch function and a display device. The display device comprises a plurality of touch electrodes arranged in an array, a plurality of pixel electrodes, a plurality of scan lines, and a plurality of data lines. The scan lines and the data lines intersect with each other to define pixel regions on the display device. Each of the pixel electrodes is arranged in the corresponding pixel region and electrically connects to the corresponding scan line and the corresponding data line. Each touch electrode corresponds to at least one pixel region; at least an opening portion is formed at the overlapping regions between each of the touch electrode and at least one of the scan lines and the data line to reduce the coupling capacitance. Through the above-described manner, the disclosure can effectively improve the precision of the touch screen.

13 Claims, 6 Drawing Sheets determining the overlapping region between the transparent electrode and the data line — S101 etching the transparent electrode according to the overlapping region ro remove at least some portion of the overlapping region between the transparent electrode and the data line to form a touch electrode having a or a plurality of opening portions — S102

ARRAY SUBSTRATE HAVING A TOUCH FUNCTION AND DISPLAY DEVICE

BACKGROUND

Technical Field

The disclosure is related to an array substrate having a touch function and a display device.

Related Art

ITO (indium tin oxide, a transparent conductive material) is adopted to manufacture a rectangular array of electrodes arranged regularly (touch sensor) on the surface of a glass substrate. These horizontal and vertical electrodes, respectively, constitute a capacitor with the ground, which is commonly referred as a self-capacitance touch screen. A planar structure of a common self-capacitance touch screen is shown as FIG. 1. The self-capacitance touch screen comprises a plurality of array unit 1. Each array unit 1 respectively corresponds to an ITO touch electrode. Each ITO touch electrode connects to the touch circuit 3 through a metal line 2 to achieve touch operation. When a finger touches the capacitor screen, the capacitance of the finger will be superimposed onto they capacitance of the screen body such that the capacitance of the screen body increase. When the touch is inspected, the horizontal and vertical electrodes on the self-capacitance touch screen are sequentially inspected. The horizontal coordinate and the vertical coordinate are respectively determined according to the capacitance variation before and after the touch. A planar touch coordinate is then generated to finally locate the precise position of the touch.

However, due to the existence of the conductive scan lines and the data lines, it is easy to form parasitic capacitance between these conductive lines and the touch electrodes. This parasitic capacitance is easy to interfere with the sensing capacitance during the touch sensing such that the sense accuracy declines. If the total capacitance is referred as Cp when the screen is not touched, and the capacitance between the finger and the ground is referred as Cf when the screen is touched, the touch accuracy is Cf/(Cp+Cf) % (Formula I). The existence of the parasitic capacitance between the touch electrode and the data line results in the increase of Cp. From the calculation of Formula, the occurrence of the parasitic capacitance greatly reduces the touch accuracy of the touch screen.

SUMMARY

The technical problem primarily solved by the disclosure is to reduce the influence of parasitic capacitance to improve the precision of the touch screen.

The embodiments of the disclosure provide an array substrate having a touch function and a display device to greatly reduce the parasitic capacitance to improve the precision of the touch screen.

In order to solve the above technical problem, one technical solution adopted by the disclosure is to provide a display device having a touch function, comprising: a plurality of touch electrodes arranged in an array; a plurality of pixel electrodes; a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line; wherein each touch electrode corresponds to at least one pixel electrode; the touch electrodes are formed with a plurality of opening portions at the overlapping regions between each of the touch electrode and at least one of the scan line and the data line, along the extending direction of the at least one of the scan line and the data line to reduce the coupling capacitance between the touch electrode and the at least one of the scan line and the data line; wherein the width of the opening portion is identical to the width of the at least one of the corresponding scan line and the corresponding data line.

Wherein the touch electrodes are integrated in the display panel of the display device, and the touch electrodes are served as the common electrodes of the display panel.

Wherein the display panel comprises an array substrate, a color filter substrate, and a liquid crystal layer; wherein the array substrate and the color filter substrate are opposite to each other, and the liquid crystal layer is sandwiched between the array substrate and the color filter substrate; wherein the touch electrodes, the pixel electrodes, the scan lines and the data lines are arranged on the array substrate.

Wherein the display panel comprises an array substrate, a color filter substrate, and a liquid crystal layer; wherein the array substrate and the color filter substrate are opposite to each other, and the liquid crystal layer is sandwiched between the array substrate and the color filter substrate; wherein the pixel electrodes, the scan lines and the data lines are arranged on the array substrate, and the touch electrodes are arranged on the color filter substrate.

Wherein the display device comprises a display panel and a touch panel attached on the display panel; wherein the touch electrodes are arranged on the touch panel.

In order to solve the above technical problem, another technical solution adopted by the disclosure is to provide a display device having a touch function, comprising: a plurality of touch electrodes arranged in an array; a plurality of pixel electrodes; a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line; wherein each touch electrode corresponds to at least one pixel region; at least an opening portion is formed at the overlapping regions between each of the touch electrode and at least one of the scan line and the data line to reduce the coupling capacitance between the touch electrode and the at least one of the scan line and the data line.

Wherein the width of the opening portion is identical to the width of the at least one of the corresponding scan line and the corresponding data line.

Wherein the touch electrodes are formed with a plurality of opening portions at the overlapping regions along the extending direction of the at least one of the scan line and the data line.

Wherein the touch electrodes are integrated in the display panel of the display device, and the touch electrodes are served as the common electrodes of the display panel.

Wherein the display panel comprises an array substrate, a color filter substrate, and a liquid crystal layer; wherein the array substrate and the color filter substrate are opposite to each other, and the liquid crystal layer is sandwiched between the array substrate and the color filter substrate; wherein the touch electrodes, the pixel electrodes, the scan lines and the data lines are arranged on the array substrate.

Wherein the display panel comprises an array substrate, a color filter substrate, and a liquid crystal layer; wherein the array substrate and the color filter substrate are opposite to each other, and the liquid crystal layer is sandwiched between the array substrate and the color filter substrate; wherein the pixel electrodes, the scan lines and the data lines are arranged on the array substrate, and the touch electrodes are arranged on the color filter substrate.

Wherein the display device comprises a display panel and a touch panel attached on the display panel; wherein the touch electrodes are arranged on the touch panel.

In order to solve the above technical problem, one technical solution adopted by the disclosure is to provide an array substrate for a display device having a touch function, comprising: a plurality of touch electrodes arranged in an array; a plurality of pixel electrodes; a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line; wherein each touch electrode corresponds to at least one pixel region; at least an opening portion is formed at the overlapping regions between each of the touch electrode and at least one of the scan line and the data line to reduce the coupling capacitance between the touch electrode and the at least one of the scan line and the data line.

Wherein the width of the opening portion is identical to the width of the at least one of the corresponding scan line and the corresponding data line; the touch electrodes are formed with a plurality of opening portions at the overlapping regions along the extending direction of the at least one of the scan line and the data line.

Wherein the touch electrodes are served as the common electrodes.

The beneficial effects of the present invention are: distinguishing from the state of the art, that at least an opening portion is formed at the overlapping regions between each of the touch electrode and at least one of the scan line and the data line to reduce the coupling capacitance between the touch electrode and the at least one of the scan line and the data line. Through such manner, the disclosure can effectively improve the precision of the touch screen.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

Figure 1:
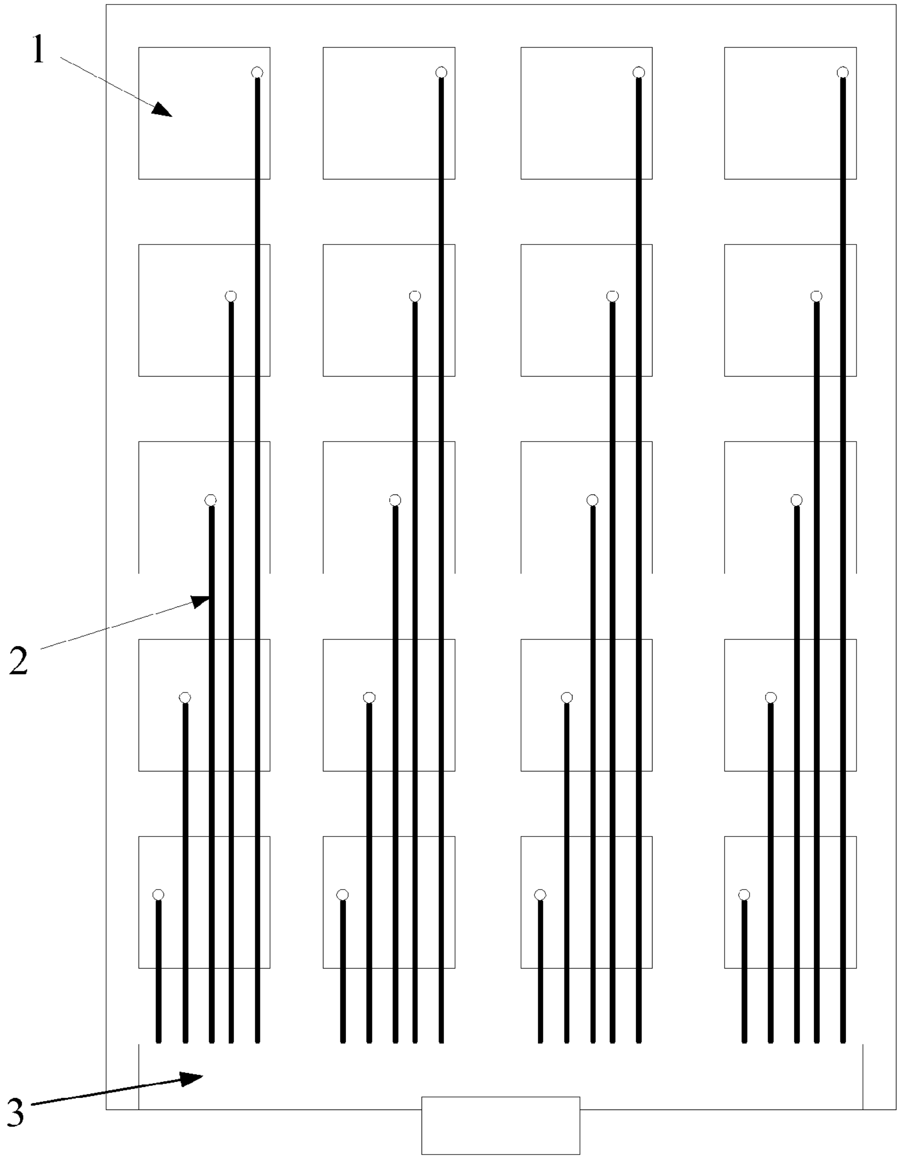
FIG. 1 is the schematic screen structure of the self-capacitive touch screen of the prior art.
Figure 2:
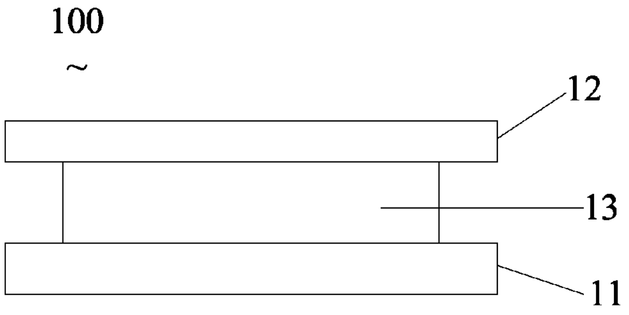
FIG. 2 is the schematic structure of a display panel of the embodiment of the disclosure.

The embodiments of the disclosure provide display devices having a touch function. The display device of the disclosure may greatly increase the touch accuracy. The display device having a touch function according to one embodiment of the disclosure comprises a display panel 100. As shown in FIG. 2, FIG. 2 is the schematic structure of a display panel 100 of the embodiment of the disclosure. As shown in the figure, the display panel comprises an array substrate 11, a color filter substrate 12 and a liquid crystal layer 13. The array substrate 11 and the color filter substrate 12 are opposite to each other, and the liquid crystal layer 13 is sandwiched between the array substrate 11 and the color filter substrate 12. Further refer to FIG. 3; the array substrate of this embodiment comprises a plurality of touch electrodes 111 (only one touch electrode being shown in the figure), a plurality of pixel electrodes 112, a plurality of scan lines 113 and a plurality of data lines 114.

The plurality of scan lines 113 and the plurality of data lines 114 intersect with each other to define a plurality of pixel regions on the display device. Each of the pixel electrodes 112 is arranged in the corresponding pixel region and electrically connects to the corresponding scan line 113 and the corresponding data line 114.

Figure 3:
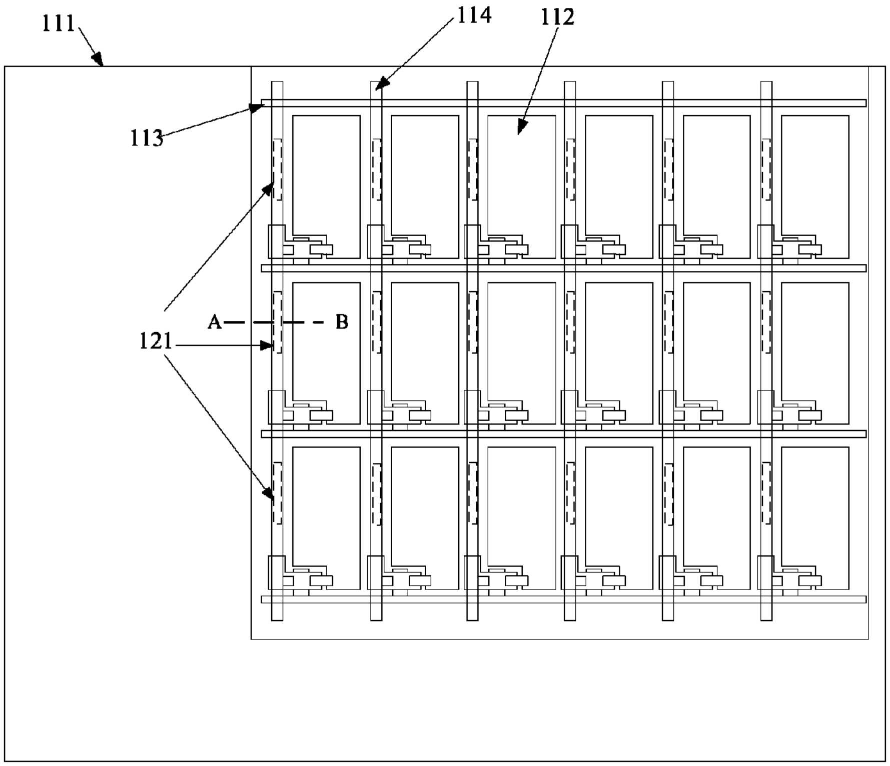
FIG. 3 is the schematic structure of an array substrate of the embodiment of the disclosure.

The touch electrode 111 is a sensing electrode for achieving the touch function on the display device. Each touch electrode 111 corresponds to at least one pixel region. As shown in FIG. 3, a touch electrode 111 may correspond to various pixel regions (18 pixel regions in the figure). At least an opening portion 121 is formed at the overlapping regions between each the touch electrode 111 and at least one of the scan line 113 and the data line 114 to reduce the coupling capacitance between the touch electrode 111 and the at least one of the scan line 113 and the data line 114.

It may be appreciated that in the embodiment of the disclosure the touch electrode 111 may be provided with an opening portion. Alternatively, the touch electrode 111 may be provided with a plurality of opening portion 121 along the extending direction of the at least one of the scan line 113 and data line 114. For example, the touch electrode 111 is provided with one opening portion 121 at the overlapping region with the scan line 113, or various opening portions 121 along the extending direction of the scan line 113, or is provided with one opening portion 121 at the overlapping region with the data line 114 or various opening portions 121 along the extending direction of the data line 114 to reduce the coupling capacitor between the touch electrode 111 and the scan line 113, or reduce the coupling capacitor between the touch electrode 111 and the data line 114. Of course, the touch electrode 111 may be provided with one opening portion 121 at the overlapping region with the scan line 113 and the data line 114, or various opening portions 121 along the extending direction of the scan line 113 and the data line 114 to simultaneously reduce the coupling capacitor between the touch electrode 111 and the scan line 113 and the coupling capacitor between the touch electrode 111 and the data line 114.

In one embodiment, the width of the opening portion of the touch electrode 111 is identical to the width of the at least one of the scan line 113 and the data line 114 such that a greater degree of reduction on the overlapping regions incurs to reduce the coupling electrodes between the touch electrode 111 and the scan line 113 and the data line 114.

It should noted that the disclosure hollows out the position of the touch electrode 111 corresponding to the data line 114 or the scan line 113, that is to configure an opening. However after the opening is formed, the touch electrode 111 is still as a whole to avoid breakage of the touch electrode 111 to further result in that a portion of the electrode 111 cannot be applied with an electric signal.

In the embodiment, the touch electrodes 111 are also served as the common electrodes of the array substrate 11.

Figure 4:
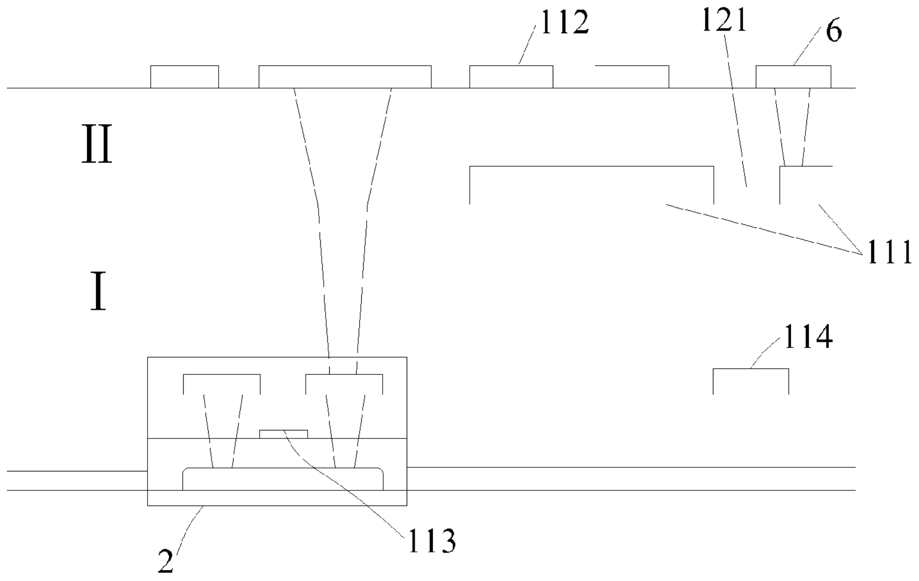
FIG. 4 is the schematic cross-sectional view at AB dot line of the array substrate shown in FIG. 3.

In order to further illustrate the disclosure, please further refer to FIG. 4. FIG. 4 is the schematic cross-sectional view at AB dot line of the array substrate shown in FIG. 3. In the figure, 113 is the scan line, 2 is the switch, 112 is the pixel electrode, 114 is the data line, 111 is the touch electrode, and 6 is the metal layer which electrically connects to the touch electrode 111 through a via hole. I and II indicate the dielectric layer. Wherein 121 is the opening portion of the touch electrode.

By way of the display device of this embodiment, the opening portion is formed at the overlapping regions between the touch electrode 111 and the data line 114 and the scan line 113 to reduce the overlapping regions between the touch electrode 111 and the data line 114 or the scan line 113 to further reduce the coupling capacitance between the touch electrode 111 and the data line 114 or the scan line 113 and to increase the touch accuracy. In the meanwhile, during the manufacturing process, it merely requires simple change on the mask pattern for forming the touch electrodes. It does require additional masks. The process is simple and facilitates to reduce costs.

Figure 5:
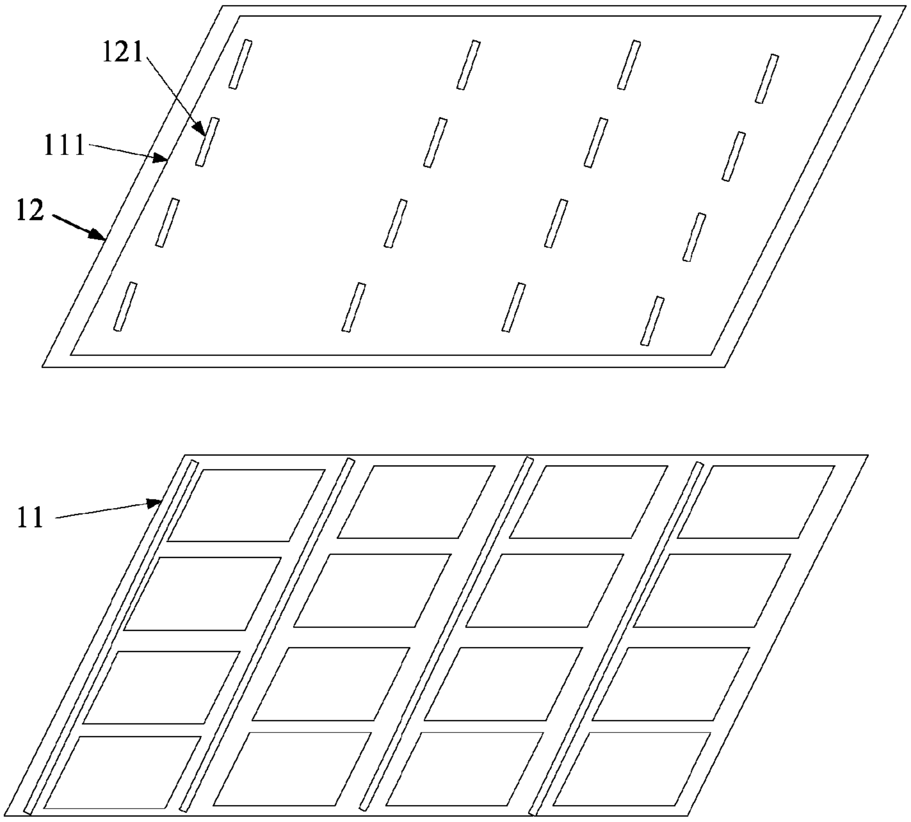
FIG. 5 is the schematic structure of another display panel of the embodiment of the disclosure.

Refer to FIG. 5. In another embodiment of the disclosure, the difference between this embodiment and the embodiment in FIG. 3 lines in that in this embodiment the array substrate 11 does not have touch electrodes. The plurality of touch electrodes 111 is formed on the color filter substrate 12. The figure merely illustrates one touch electrode 111, and one touch electrode 111 corresponds to a plurality of pixel electrodes 112. The touch electrode 111 is formed with a plurality of opening portions 121 at the overlapping region between the touch electrode 111 and the data line 114 to reduce the coupling capacitance between the touch electrode 111 and the data line 114.

Of course, in the other embodiments, a plurality of openings may be formed at the overlapping regions between the touch electrodes and the scan lines to reduce the coupling capacitance between the touch electrodes and the scan lines.

The touch electrodes 111 are also served as the common electrodes of the color filter substrate 12.

It may be appreciated in this embodiment the specific principle for configuring the opening portion 121 of the touch electrode 111 is the same as that in the above embodiment and thus it is not repeated again.

Figure 6:
FIG. 6 is the schematic structure of another display device of the embodiment of the disclosure.

Further refer to FIG. 6. FIG. 6 is the schematic structure of another display device of the embodiment of the disclosure. In this embodiment, the display device comprises a display panel 200 and a touch panel 300. The touch panel 300 is attached on the light-emitting surface of the display panel 200.

Figure 7:
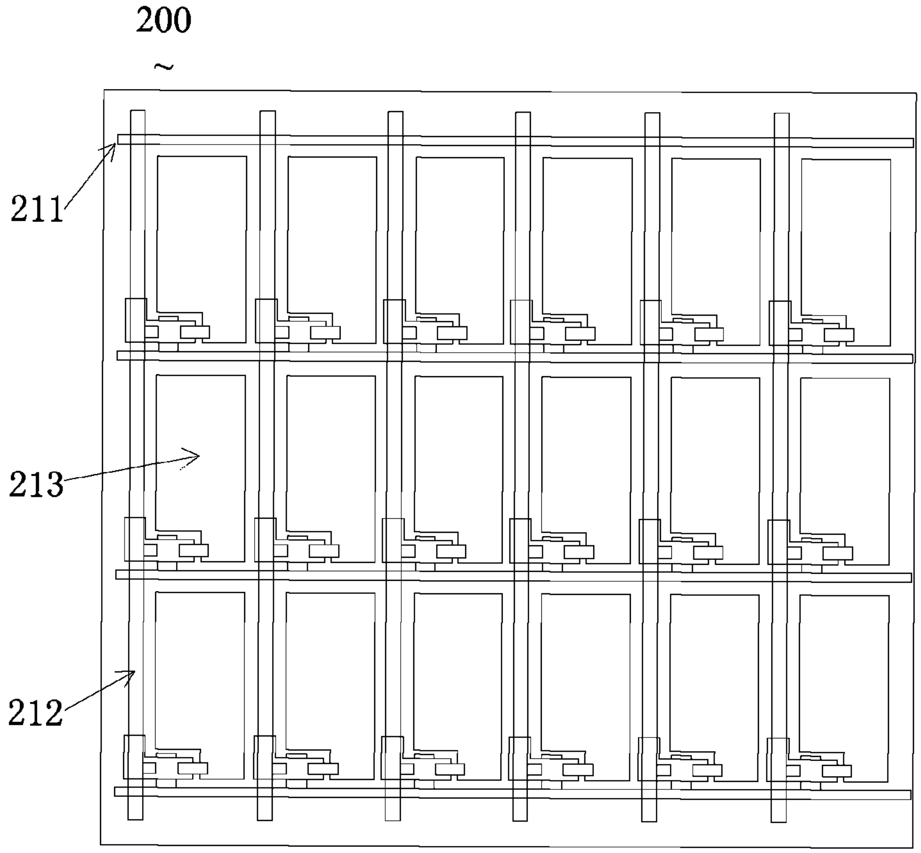
FIG. 7 is the schematic structure of the display panel of the display device shown in FIG. 6.

As shown in FIG. 7, the display panel 200 comprises a plurality of scan lines 211, a plurality of data lines 212, and a plurality of pixel electrodes 213. The plurality of scan lines 211 and the plurality of data lines 212 intersect with each other to define the plurality of pixel regions in the display panel 200. Each of the pixel electrodes 213 is configured in a corresponding pixel electrode and electrically connect to a corresponding scan line 211 and a corresponding data line 212.

Figure 8:
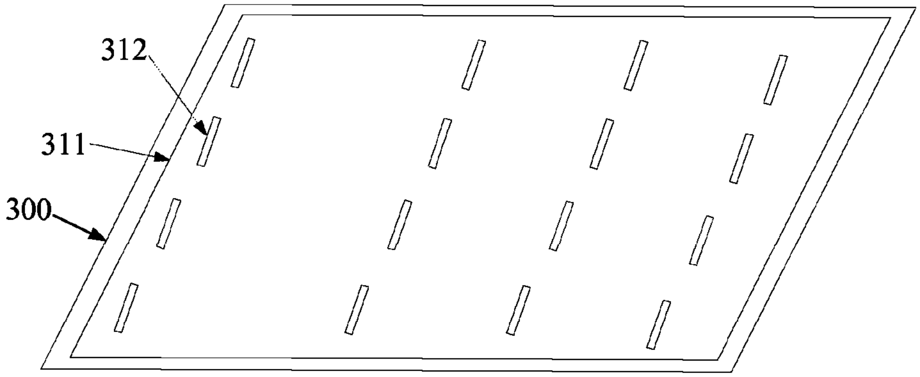
FIG. 8 is the schematic structure of the touch panel of the display device shown in FIG. 6.

As shown in FIG. 8, the touch panel 300 comprises a plurality of touch electrodes 311 (the figure merely illustrates one of the touch electrodes). Each of the touch electrodes 311 respectively corresponds to at least one pixel region. In this embodiment, each electrode 311 corresponds to a plurality of pixel regions (the figure illustrates 12 pixel regions). Each touch electrode 111 is formed with a plurality of opening portions 312 at the overlapping regions between the touch electrode 111 and the data line to reduce the coupling capacitance between the touch electrode 311 and the data line.

Of course, in the other embodiments, a plurality of opening portions may also be formed at the overlapping regions between the touch electrodes and the scan lines or reduce the coupling capacitance between the touch electrodes and the scan lines.

The specific principle for configuring the opening portion 312 of the touch electrode 311 may refer to the detailed description of the above embodiment.

On the basis of the embodiment of the display device provided above, the disclosure further provides an array substrate for the display panel having a touch function. The specific structure of the array substrate may refer to the detailed description of the embodiment in FIG. 3.

On the basis of the embodiment of the display device provided above, the disclosure further provides a color filter substrate. The color filter substrate is arranged with a plurality of touch electrodes. Each of the touch electrodes respectively corresponds to at least one pixel region. At least an opening portion is formed at the overlapping regions between each touch electrode and at least one of the scan line 113 and the data line 114 to reduce the coupling capacitance between the touch electrode 111 and the at least one of the scan line 113 and the data line 114. The specific configuration of the touch electrode may refer to the detailed description of the embodiments above.

The detailed description is provided for the embodiments of the display device having the touch function and the array substrate. It may be appreciated that the disclosure reduces the coupling capacitance between the touch electrode and the at least one of the scan line and the data line by way of forming at least an opening portion at the overlapping region between the touch electrode and the at least one of the scan line and the data line. By way of such manner, the touch accuracy of the self-capacitance touch screen may be effectively increased.

Figure 9:
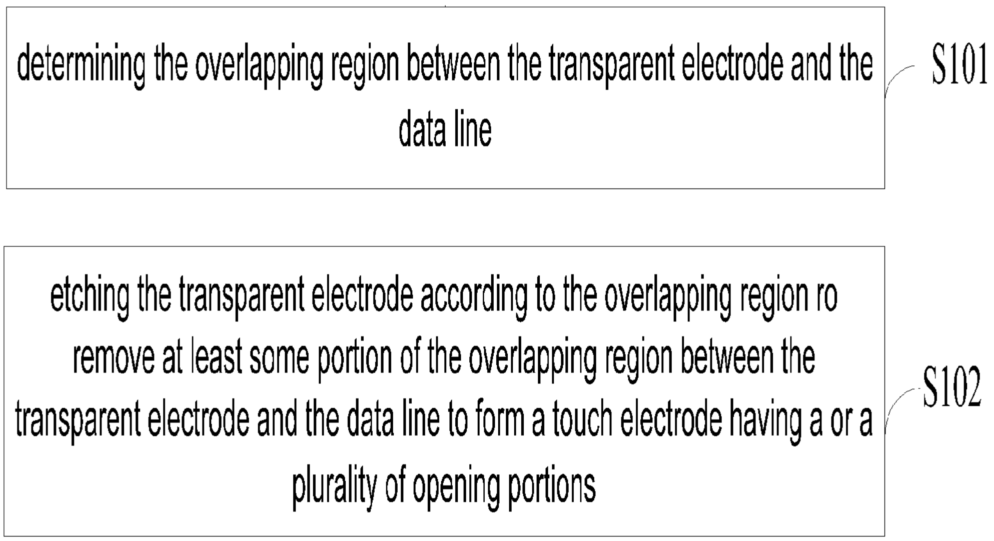
FIG. 9 is the manufacturing process for making the array substrate having a touch function of the embodiment of the disclosure.

Please further refer to FIG. 9. FIG. 9 is the manufacturing process for making the array substrate having a touch function of the embodiment of the disclosure. The method for manufacturing the array substrate having a touch function of the embodiment of the disclosure comprises the following steps:

S101: deterring the overlapping region between the transparent electrode and the data line.

According the situation of the overlapping between the data line and the transparent electrode in combination with the actual process capability, the maximum removable area on the transparent electrode is calculated. The purpose of the maximum removable area is to minimize the overlapping area, while ensuring that the touch electrode formed after removing remains as a whole.

S102: etching the transparent electrode according to the overlapping region to remove at least some portion of the overlapping region between the transparent electrode and the data line to form a touch electrode having a or a plurality of opening portions.

The purpose of the disclosure is to hollow out the at least some portion of the overlapping region of the touch region with the data line to reduce the coupling region between the touch electrode and the at least one of the data line and the metal line. During the manufacturing process, the portion of the touch electrode for connecting the metal line does not require to be removed to ensure the connection between the metal line and the touch electrode.

In one embodiment, the width of the removed region is identical to the width of the data line.

During the actual manufacturing process, the at least some portion of the overlapping region of the at least one of the touch electrode and the data line may be removed after the touch electrode is formed. Alternatively, the touch electrode having at least an opening portion may be formed in one step by way of appropriate mask when the transparent electrode is etched to form the touch electrode. Of course, in order to simplify the manufacture process and control the cost, the latter is preferable.

According the determined area that needs to be removed on the transparent electrode, the mask used to etch the transparent electrode corresponding to the portion that needs to be removed is shielded or translucent to etch the transparent electrode to form the touch electrode. The touch electrode in compliance with the conditions of the disclosure is obtained through reasonable control on filming and yellow etching process for the touch electrode.

Of course, in other embodiment, the same method may be adopted to arrange various opening portions at the overlapping region between the touch electrode and the scan line to reduce the coupling capacitance between the touch electrode and the scan line.

By way of such manner, the problem of the decrease of the touch accuracy caused by the parasitic capacitance may be better improved for the self-capacitance touch screen by simple improvement on the manufacture process without increasing the cost. The improvement on the touch array electrode of the self-capacitance touch screen by the disclosure may be applied in the touch screen for the medium and small size products, such as smart phone, tablet computer and etc.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A display device having a touch function, comprising:

a plurality of touch electrodes arranged in an array;

a plurality of pixel electrodes;

a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line;

wherein each touch electrode corresponds to at least one pixel electrode; the touch electrodes are formed with a plurality of opening portions at the overlapping regions between each of the touch electrode and at least one of the scan line and the data line, along the extending direction of the at least one of the scan line and the data line to reduce the coupling capacitance between the touch electrode and the at least one of the scan line and the data line;

wherein the width of the opening portion is identical to the width of the at least one of the corresponding scan line and the corresponding data line.

2. The display device having a touch function according to claim 1, wherein the touch electrodes are integrated in the display panel of the display device, and the touch electrodes are used as the common electrodes of the display panel.

3. The display device having a touch function according to claim 2, wherein the display panel comprises an array substrate, a color filter substrate, and a liquid crystal layer; wherein the array substrate and the color filter substrate are opposite to each other, and the liquid crystal layer is sandwiched between the array substrate and the color filter substrate;

wherein the touch electrodes, the pixel electrodes, the scan lines and the data lines are arranged on the array substrate.

4. The display device having a touch function according to claim 2, wherein the display panel comprises an array substrate, a color filter substrate, and a liquid crystal layer; wherein the array substrate and the color filter substrate are opposite to each other, and the liquid crystal layer is sandwiched between the array substrate and the color filter substrate;

wherein the pixel electrodes, the scan lines and the data lines are arranged on the array substrate, and the touch electrodes are arranged on the color filter substrate.

5. The display device having a touch function according to claim 1, wherein the display device comprises a display panel and a touch panel attached on the display panel; wherein the touch electrodes are arranged on the touch panel.

6. A display device having a touch function, comprising:

a plurality of touch electrodes arranged in an array;

a plurality of pixel electrodes;

a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line;

wherein each touch electrode corresponds to at least one pixel region; at least an opening portion is formed at the overlapping regions between each of the touch electrode and at least one of the scan line and the data line to reduce the coupling capacitance between the touch electrode and the at least one of the scan line and the data line, wherein the width of the opening portion is identical to the width of the at least one of the corresponding scan line and the corresponding data line.

7. The display device having a touch function according to claim 6, wherein the touch electrodes are integrated in the display panel of the display device, and the touch electrodes are used as the common electrodes of the display panel.

8. The display device having a touch function according to claim 7, wherein the display panel comprises an array substrate, a color filter substrate, and a liquid crystal layer; wherein the array substrate and the color filter substrate are opposite to each other, and the liquid crystal layer is sandwiched between the array substrate and the color filter substrate;

wherein the touch electrodes, the pixel electrodes, the scan lines and the data lines are arranged on the array substrate.

9. The display device having a touch function according to claim 7, wherein the display panel comprises an array substrate, a color filter substrate, and a liquid crystal layer; wherein the array substrate and the color filter substrate are opposite to each other, and the liquid crystal layer is sandwiched between the array substrate and the color filter substrate;

wherein the pixel electrodes, the scan lines and the data lines are arranged on the array substrate, and the touch electrodes are arranged on the color filter substrate.

10. The display device having a touch function according to claim 6, wherein the display device comprises a display panel and a touch panel attached on the display panel; wherein the touch electrodes are arranged on the touch panel.

11. An array substrate for a display device having a touch function, comprising:

a plurality of touch electrodes arranged in an array;

a plurality of pixel electrodes;

a plurality of scan lines; and a plurality of data lines, wherein the plurality of scan lines and the plurality of data lines intersect with each other to define a plurality of pixel regions on the display device, each of the pixel electrode is arranged in the corresponding pixel region and electrically connects to the corresponding scan line and the corresponding data line;

wherein each touch electrode corresponds to at least one pixel region; at least an opening portion is formed at the overlapping regions between each of the touch electrode and at least one of the scan line and the data line to reduce the coupling capacitance between the touch electrode and the at least one of the scan line and the data line;

wherein the width of the opening portion is identical to the width of the at least one of the corresponding scan line and the corresponding data line.

12. The array substrate according to claim 11, wherein the touch electrodes are formed with a plurality of opening portions at the overlapping regions along the extending direction of the at least one of the scan line and the data line.

13. The array substrate according to claim 11, wherein the touch electrodes are used as the common electrodes.

* * * * *